United States Patent [19]

Furlani et al.

[11] Patent Number: 5,708,893
[45] Date of Patent: Jan. 13, 1998

[54] MICROCERAMIC ELECTROMAGNETIC LIGHT SHUTTER

[75] Inventors: Edward P. Furlani, Lancaster; Dilip K. Chatterjee; Syamal K. Ghosh, both of Rochester, all of N.Y.

[73] Assignee: Eastman Kodak Company, Rochester, N.Y.

[21] Appl. No.: 808,897

[22] Filed: Feb. 28, 1997

[51] Int. Cl.⁶ .................................................. G03B 9/08
[52] U.S. Cl. ........................................ 396/464; 396/463
[58] Field of Search .................................. 396/452, 463, 396/468, 449, 450

[56] References Cited

U.S. PATENT DOCUMENTS 4,384,778  5/1983  Lee et al. ............................. 354/230

*Primary Examiner*—Safet Metjahic
*Assistant Examiner*—Eric Nelson
*Attorney, Agent, or Firm*—Raymond L. Owens

[57] ABSTRACT

A microceramic electromagnetic light shutter is disclosed including a unitary ceramic body having an internal cavity. A conductive coil is formed in the internal cavity. The unitary ceramic body defines a first and second bearing structure on it's surface. The unitary ceramic body has a light aperture and first and second recesses. The microceramic electromagnetic light shutter further includes a shutter drive mechanism including a shutter blade and a ferromagnetic element inserted into the first recess and operative to the shutter drive mechanism for applying a torque to the shutter drive mechanism which causes the shutter drive mechanism to move so that the shutter blade is in it's light blocking position. The shutter drive mechanism is mounted in the second recess an in an operative relationship to the coil and ferromagnetic element. The shutter blade is movable between a light blocking and light passing positions relative to the light aperture so that when a drive voltage is applied to the coil a field is created by the coil which provides a torque to the shutter drive mechanism to overcome the torque applied by the ferromagnetic element thereby causing the shutter blade to move to the light passing position. When the drive voltage is discontinued the ferromagnetic element provides a torque on the shutter mechanism causing the shutter blade to return to the light blocking position.

5 Claims, 6 Drawing Sheets

MICROCERAMIC ELECTROMAGNETIC LIGHT SHUTTER

CROSS REFERENCE TO RELATED APPLICATION

Reference is made to commonly assigned and concurrently filed U.S. patent application Ser. No. 08/808,896 entitled "Method of Making a Microceramic Electromagnetic Light Shutter" by Ghosh et al, the teachings of which are incorporated herein.

FIELD OF THE INVENTION

The present invention relates to electromagnetic light shutters which can be used as shutters for light exposure applications.

BACKGROUND OF THE INVENTION

Electromechanical shutters are well known in the art and have been used in a number of applications, for example, in which light exposes a photosensitive surface. It is, of course, highly advantageous to miniaturize such shutters. Conventional electromechanical shutters are typically greater that 1 cubic centimeter in volume. The materials and methods for the fabrication of these devices are inadequate for the fabrication of microelectromechanical shutters which are less than 1 cubic centimeter in volume.

SUMMARY OF THE INVENTION

It is an object of the present invention to provide miniaturized shutters which are less than 1 cubic centimeter in volume.

This object is achieved in a microceramic electromagnetic light shutter comprising:
(a) a unitary ceramic body having an internal cavity,
(b) a conductive coil formed in the internal cavity;
(c) the unitary ceramic body defining a first and second bearing structure on its surface; the unitary ceramic body having a light aperture therethrough and defining first and second recesses;
(d) a shutter drive mechanism, including a shutter blade;
(e) a ferromagnetic element inserted into the first recess and operative relationship to the shutter drive mechanism for applying a torque to the shutter drive mechanism which causes the shutter drive mechanism to move so that the shutter blade is in its light blocking position; and
(f) the shutter drive mechanism being mounted in the second recess and in operative relationship to the coil and ferromagnetic element, and having a shutter blade which is movable between light blocking and light passing positions relative to the light aperture so that when a drive voltage is applied to the coil, a field is created by the coil which provides a torque to the shutter drive mechanism to overcome the torque applied by the ferromagnetic element thereby causing the shutter blade to move to the light passing position, and when the drive voltage is discontinued the ferromagnetic element provides a torque on the shutter mechanism causing the shutter blade to return to the light blocking position.

ADVANTAGES

It is a feature of the present invention that miniaturized shutters can be fabricated using micromolded ceramic technology.

Microceramic shutters have a number of advantages; they can withstand harsh corrosive or high temperature environments. Another feature of this invention is that by using micromolded ceramic technology, shutters can be made in high volume with high yields at reduced cost.

BRIEF DESCRIPTION OF THE DRAWINGS

FIG. 3c is a cross-sectional view of the insert member taken along the lines A—A of FIG. 3a;

FIG. 5b is a perspective of the ferromagnetic element that is inserted into the shutter mechanism of FIG. 5a;

DETAILED DESCRIPTION OF THE PREFERRED EMBODIMENTS

Figure 1:
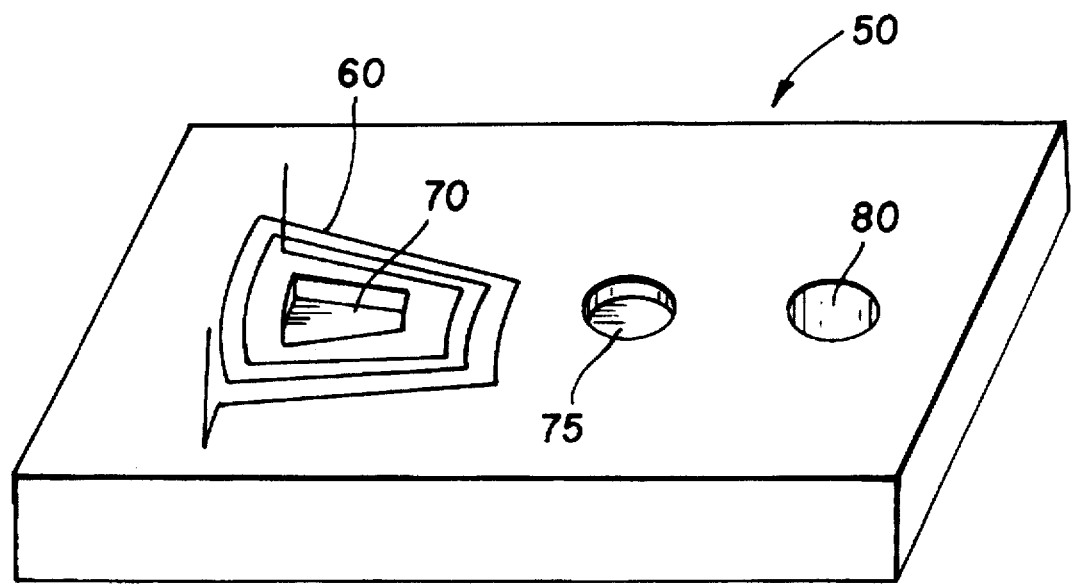
FIG. 1 is a perspective of a micromolded ceramic block, with mounted sacrificial fiber, which forms the base element of a microceramic shutter in accordance with the present invention.

Referring to FIG. 1 a perspective is illustrated of a micromolded ceramic block 50 in the green state with mounted sacrificial fiber 60, recesses 70 and 75, and through-hole 80. The sacrificial fiber 60 is on the order of 100 microns in diameter or less and is made from refractory materials such as tungsten (W), molybdenum (Mo), or Tantalum (Ta). In this document, the term green state refers to a compacted ceramic body comprising ceramic powder with (or without) organic binders. The ceramic powder could be dry or in a state of slurry mixed with organic binders. The ceramic powder should preferably be selected from the following materials: alumina, titania, zirconia, or alumina-zirconia composites.

Figure 2:
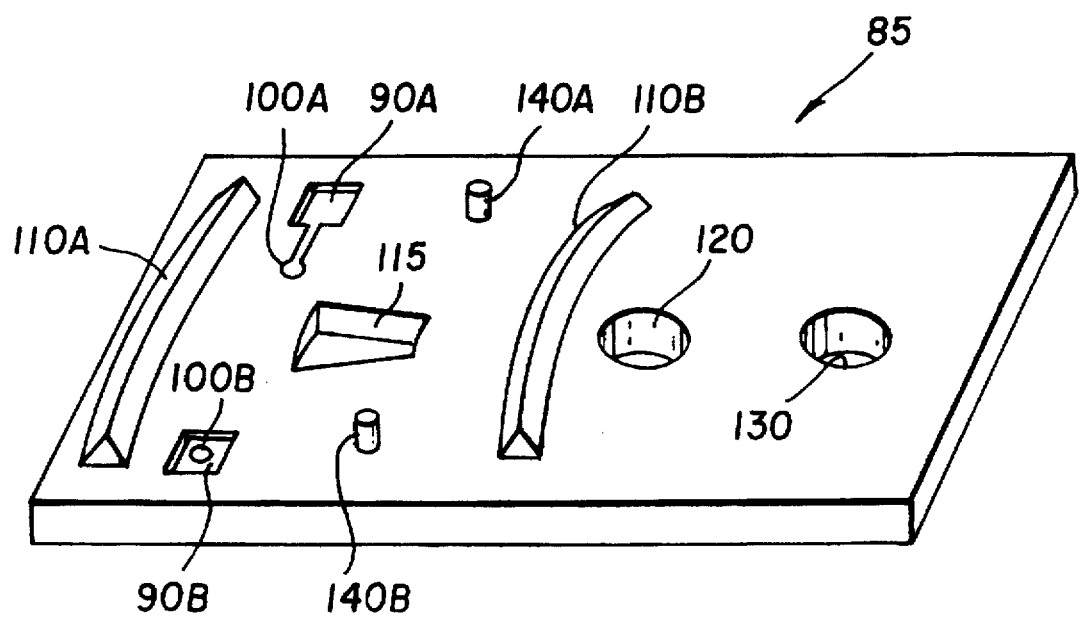
FIG. 2 is a perspective of a micromolded ceramic top portion which when combined with the structure of FIG. 1 forms the body of the structure.

Referring to FIG. 2 a perspective is illustrated of a micromolded ceramic top portion 85 in the green state. The top portion 85 has recesses 90A and 90B and through-holes 100A and 100B. The through-holes 100A and 100B are for receiving the ends of the sacrificial fiber 60. In addition to these features there are raised bearing structures 110A and 110B, through-holes 115, 120 and 130, and raised stop structures 140A and 140B.

Figure 3A:
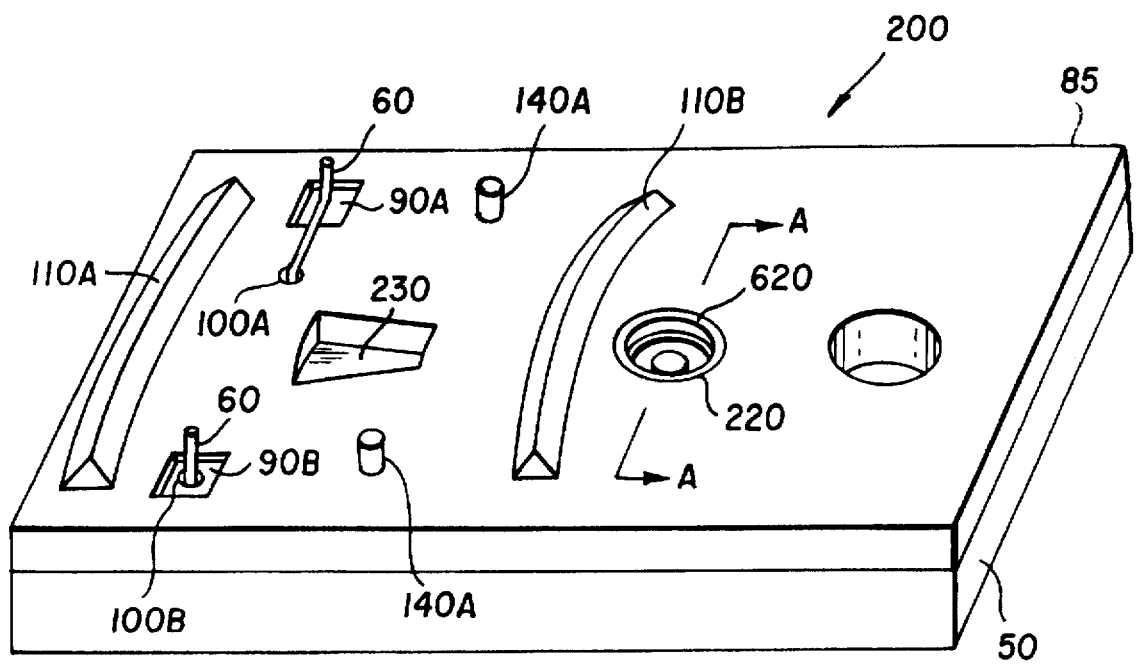
FIG. 3a is a perspective of an assembled shutter mechanism prior to sintering.
Figure 3B:
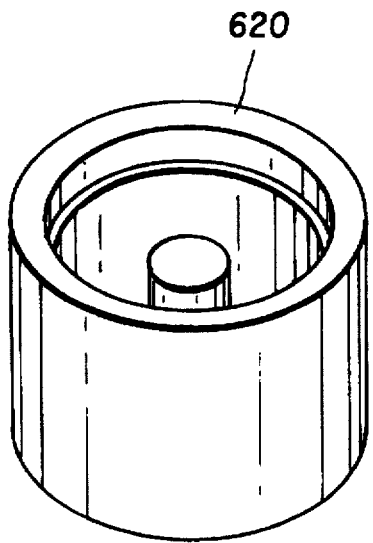
FIG. 3b is a perspective of an insert member which when inserted into the assembled shutter mechanism of FIG. 3a provides a bearing surface.
Figure 3C:
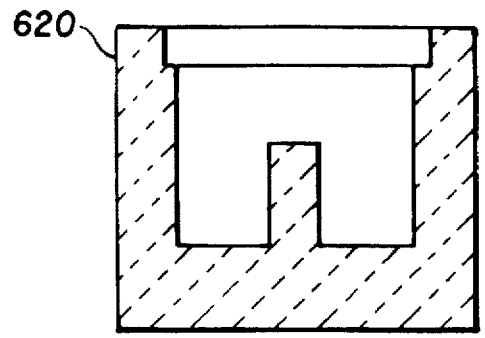

Referring to FIG. 3a, a perspectives is illustrated of the assembled unitary ceramic body 200 in which the top portion 85 is placed on ceramic block 50. The end portions of sacrificial fiber 60 are drawn through holes 100A and 100B. A green ceramic insert 620 made from $MoSi_2$ or $ZrB_2$ is placed in recess 220 in unitary ceramic body 200 which is formed by the mating of recess 75 in ceramic block 50 with through-hole 120 in top portion 85 shown in FIGS. 1 and 2, respectively. There is an additional recess 230 in unitary ceramic body 200 which is formed by the mating of recess 70 in ceramic block 50 with through-hole 115 in top portion 85 shown in FIGS. 1 and 2, respectively. FIG. 3b, illustrates the insert 620 in isolation. FIG. 3c illustrates a cross-sectional view of the insert 620 taken along the lines A—A in FIG. 5a.

Figure 4:
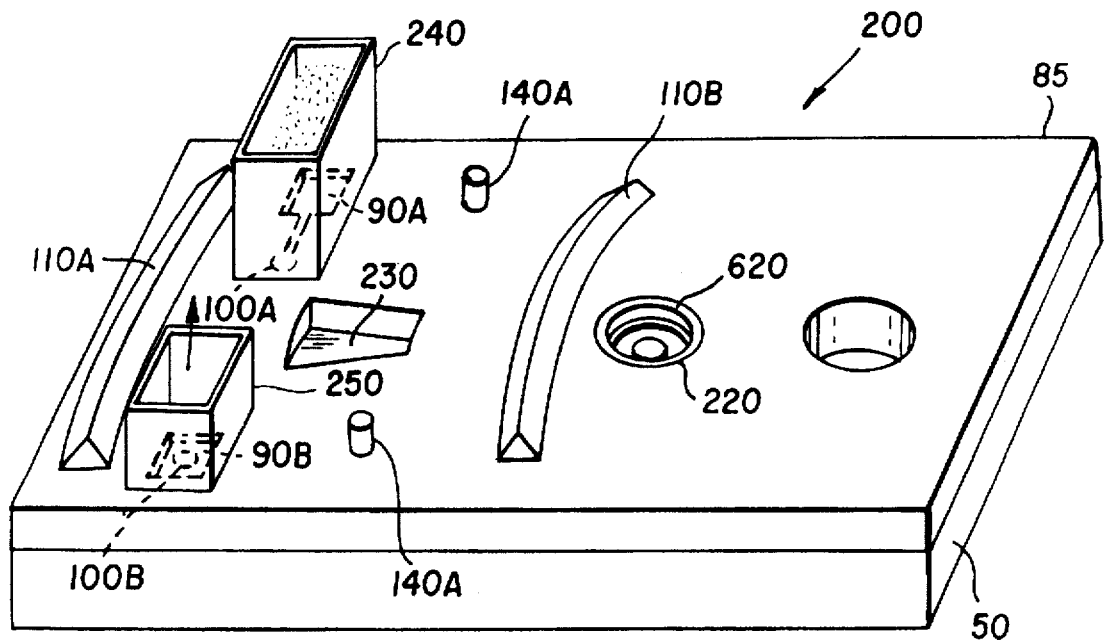
FIG. 4 is a perspective of the structure in FIG. 3a shown after a sintering and etching process with apparatus mounted for filling the internal cavity that results from etching away the embedded sacrificial member.

Referring to FIG. 4, a perspective is shown of the unitary ceramic body 200 after a sintering and etching process with apparatus mounted for filling the internal cavity that results from etching away embedded sacrificial fiber 60. Specifically, a nonporous containment structure (dam) 240 is mounted around recess 90A and through-hole 100A, and a vacuum chamber structure 250 is mounted around through-hole 100B. Containment structure 240 is filed with a molten pool of conductive metal alloy such as Au, Ag, Ag—Cu, or Cu—Sn or alternatively a thin film conductive paste. A vacuum is applied to vacuum chamber structures 250 so as to the draw conductive metal alloy into the embedded etched path connecting through holes 100A and 100B thereby forming an embedded coil 530 (not shown) in the form of sacrificial fiber 60 (see FIG. 1) within unitary ceramic body 200 with terminal ends in the form of conductive pads 95A and 95B on the surface of unitary ceramic body 200 (see FIG. 5a).

Figure 5A:
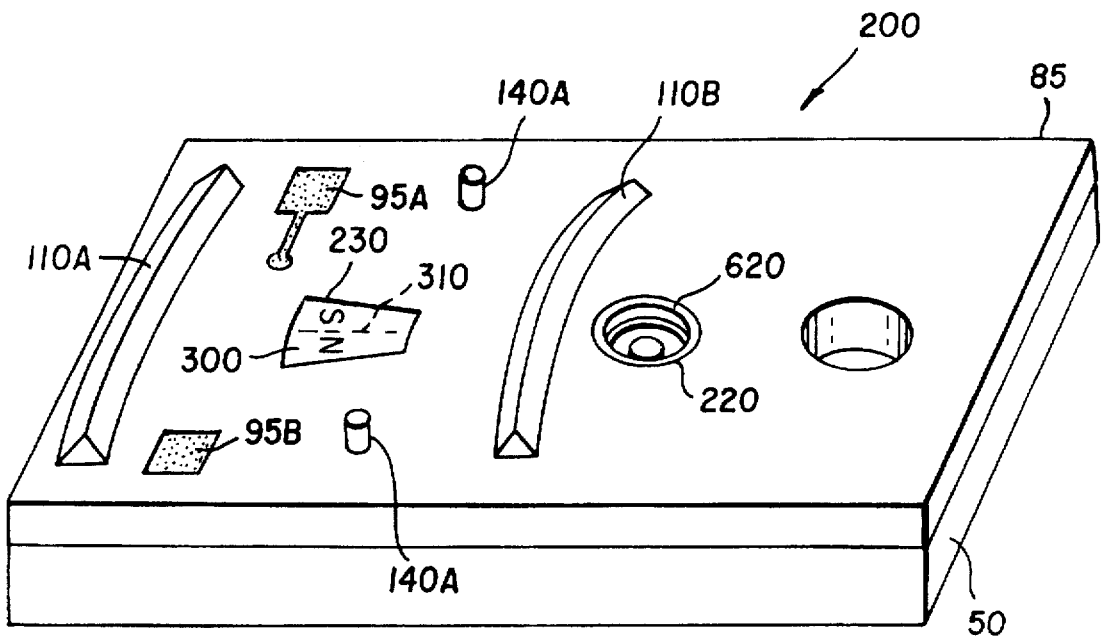
FIG. 5a is a perspective of the shutter mechanism in an intermediate step of fabrication in which the etched internal cavity has been filled with conductive material and a ferromagnetic element has been inserted into a recess.
Figure 5B:
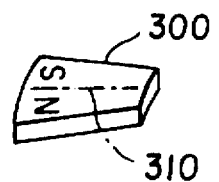

Referring to FIG. 5a, a perspective of the shutter mechanism at an intermediate stage of fabrication is illustrated. Specifically, conductive pads 95A and 95B are shown, and a ferromagnetic element 300 is shown inserted into recess 230. The ferromagnetic element 300 is preferably made from a hard magnetic material such as neodynium—iron—boron which is polarized with north and south surface poles which are adjacent to one another along centerline 310 as shown. Alternatively, ferromagnetic element 300 can be made from a soft-magnetic material such as permalloy, supermalloy, sendust, iron, nickel, nickel—iron or alloys thereof. Referring to FIG. 5b, a perspective of ferromagnetic element 300 is shown in isolation.

Figure 6A:
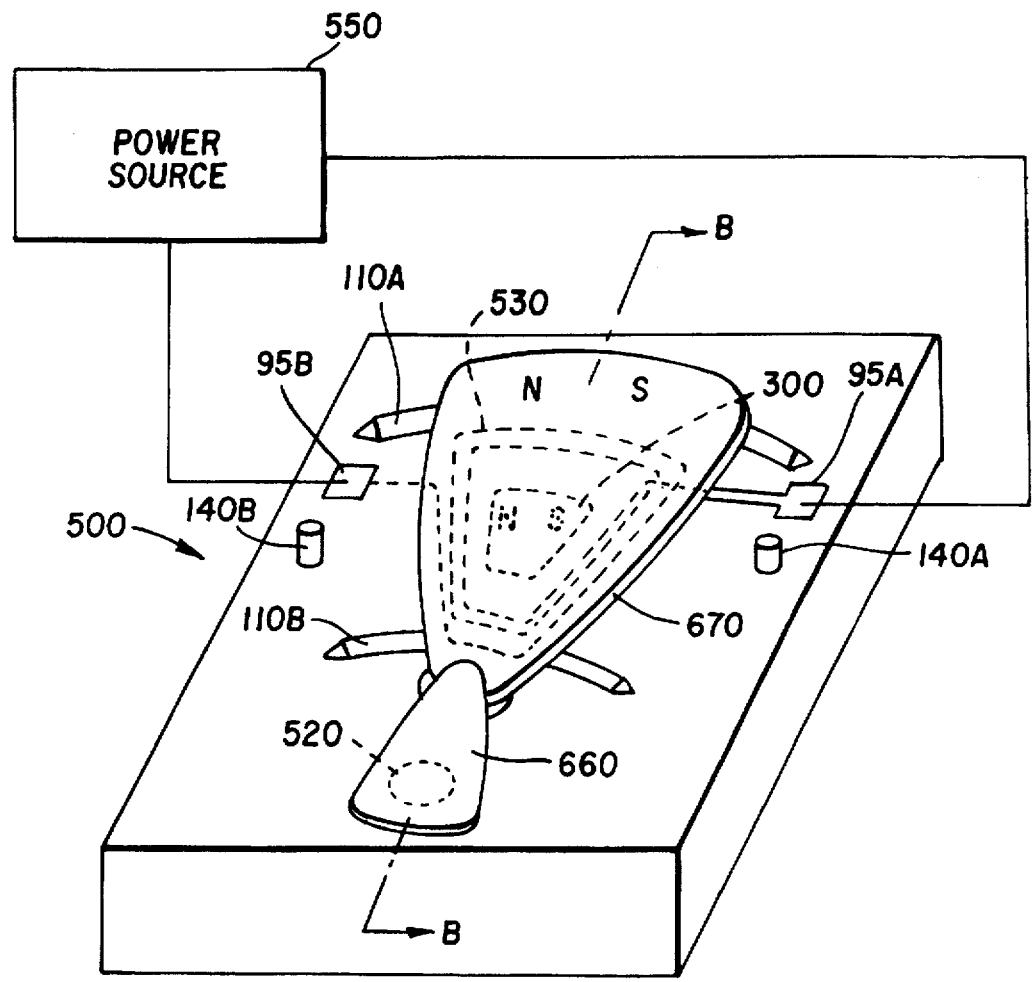
FIG. 6a is a perspective of an assembled shutter with attached power source.
Figure 7A:
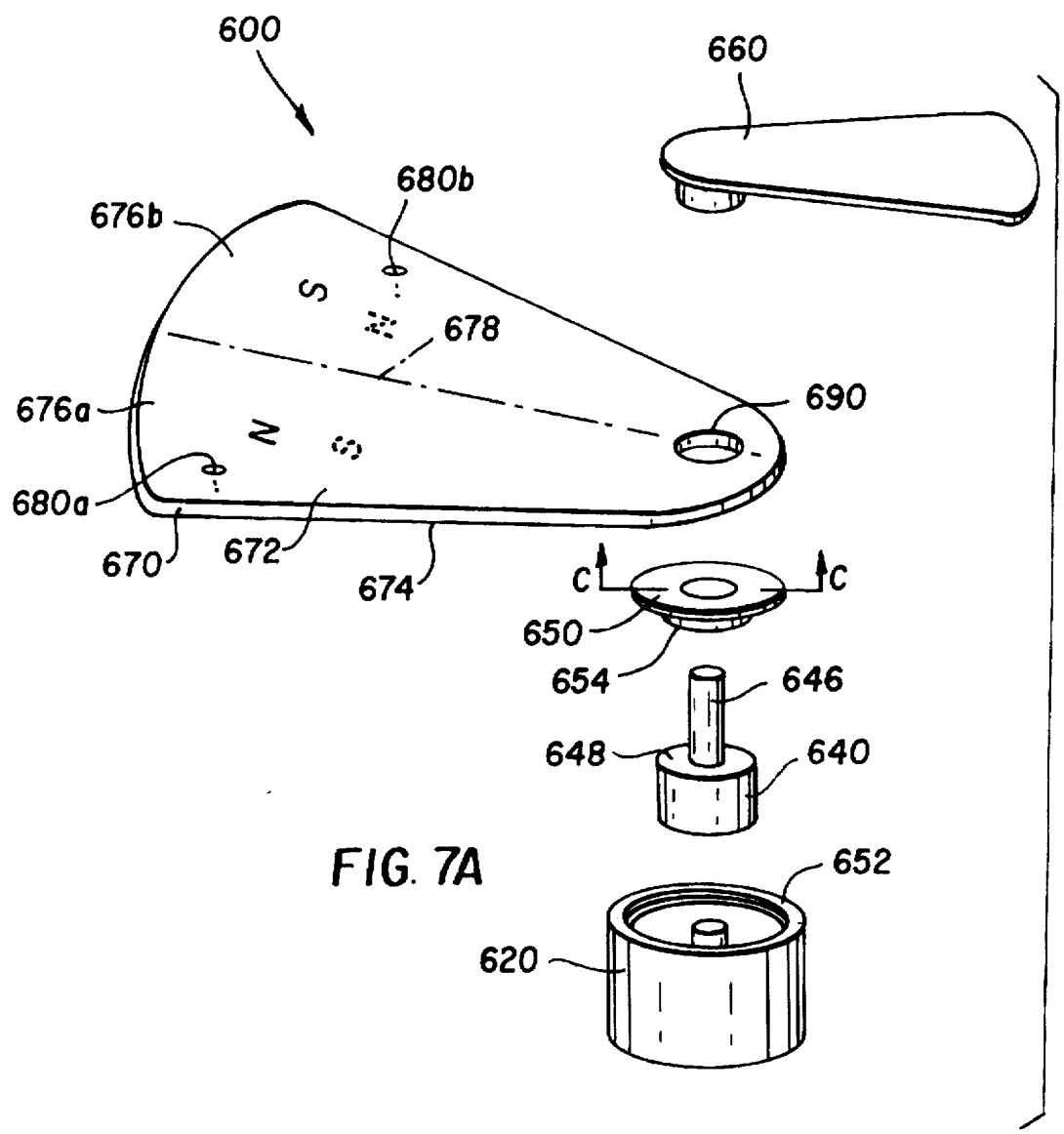
FIG. 7a is an exploded view of the shutter assembly.

Referring to FIG. 6a, a perspective is shown of the assembled shutter 500 with ferromagnetic element 300, shutter aperture 520, embedded coil 530, power source 550, and shutter assembly 600 (see FIG. 7a). Shutter aperture 520 is formed by the mating of through-hole 80 in ceramic block 50 and through-hole 130 in top portion 85 shown in FIGS. 1 and 2, respectively. Power source 500 is electrically connected to conductive pads 95A and 95B so as to provide current to embedded coil 530 for causing rotation of micromagnet 670 and hence shutter blade 660 as will be described.

Figure 6B:
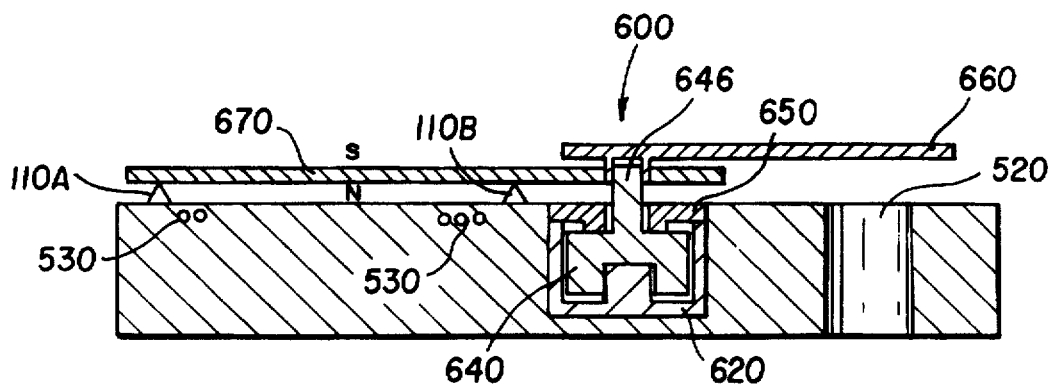
FIG. 6b is a cross-sectional view of the assembled shutter of FIG. 6a taken along line B—B.

Referring to FIG. 6b, assembled light shutter 500 and shutter assembly 600 are shown in a cross-sectional view taken along line B—B of FIG. 5a. Shutter assembly 600 comprises a low friction ceramic insert 620, a rotor 640 with shaft 646, a top plug 650, a shutter blade 660, and a micromagnet 670. The bearing structures 110A and 110B which are an integral part of the ceramic body 200 support the weight of micromagnet 670 and provide a low friction bearing for permitting rotation of micromagnet 670 which is fixedly attached to shutter blade 660. The ceramic insert 620, which is also an integral part of the ceramic body 200 provides a lower bearing surface for rotor 640 for permitting rotation of rotor 640 and shaft 646 which is fixedly attached to shutter blade 660. Top plug 650, which is shrunk fit into insert 620 provides an upper bearing surface for rotor 640 while at the same time confining rotor 640 to remain within insert 620 during rotation.

Figure 7B:
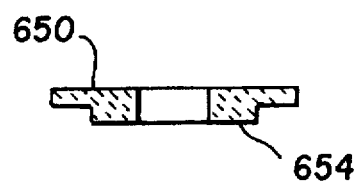
FIG. 7b is a cross-sectional view of a top plug member of the shutter assembly of FIG. 7a, taken along lines C—C.

Referring to FIG. 7, an exploded view of the shutter assembly 600 is shown depicting how its components are assembled as a unit in the ceramic body 200. The shutter assembly 600 comprises a low friction ceramic insert 620, a rotor 640 with shaft 646, a top plug 650, a shutter blade 660, and a micromagnet 670. The ceramic insert 620, which is as an integral part of the ceramic body 200 (see FIG. 3a), provides a lower bearing surface for rotor member 640 and is made using low friction ceramic material such as $MoSi_2$ or $ZrB_2$. It is instructive to note that the ceramic body 200 (see FIG. 3a) is sintered in absence of air to keep the silicide or boride in insert 620 and other members, from oxidizing. Rotor 640 is also made using low friction ceramic material such as $MoSi_2$ or $ZrB_2$. The top plug 650 is shrunk fit into insert 620 and rests on ledge 652 of insert 620. The surface 654 of plug 650 functions as an upper, low friction bearing for the top surface 648 of rotor 640. The top plug 650 is also made of a low friction ceramic material such as $MoSi_2$ or $ZrB_2$. The shutter blade 660 can be constructed using light metals such as Al, Mg, or Al-alloys or alternatively, opaque plastics such as nylon or polyethylene or PVC. The shutter blade 660 is press fit into the receiving hole 690 of micromagnet 670. Micromagnet 670 is made from a hard magnetic material such neodynium—iron—boron. It has a top surface 672 and a bottom surface 674 and is polarized perpendicularly to these surfaces with north and south surface poles 676a and 676b, respectively, on its top surface 672 adjacent to one another along centerline 678 which is shown as a dashed line. The bottom surface 674 will have corresponding south and north surface poles, 680a and 680b beneath poles 676a and 676b, respectively, as shown.

Figure 8A:
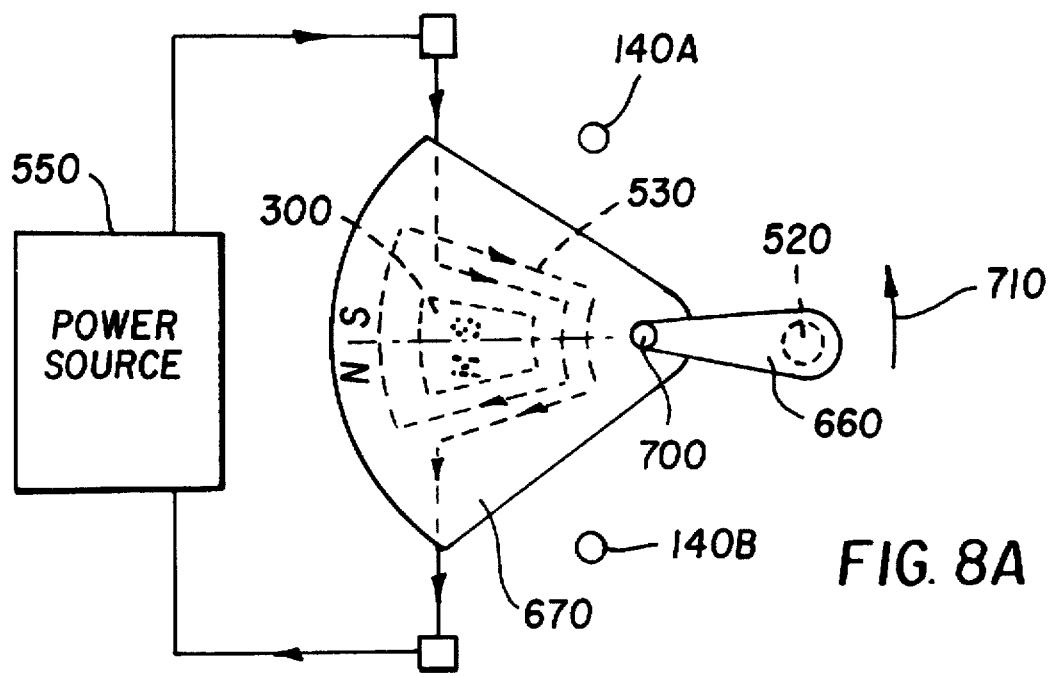
FIGS. 8a and 8b are schematic diagrams depicting of the operation of the shutter.
Figure 8B:
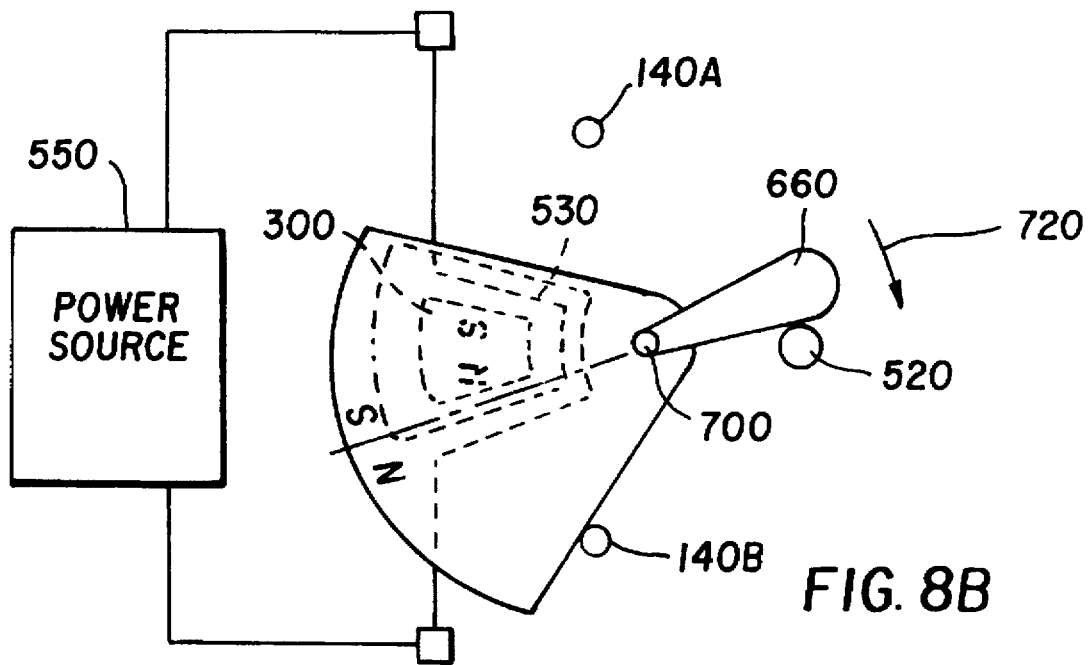

Referring to FIGS. 8a and 8b, schematic diagrams are shown depicting the operation of assembled light shutter 500. In FIG. 8a, shutter blade 660, which is fixedly attached to rotatable micromagnet 670, is in a first, light blocking position preventing light from passing through aperture 520. The shutter blade 660 is held in the light blocking position because of the attraction of micromagnet 670 to ferromagnetic element 300. Specifically, the south and north surface poles 680a and 680b, respectively on the bottom surface of micromagnet 670 (shown in FIG. 7a) have respective attractive forces to north and south surface poles of ferromagnetic element 300. It is instructive to note that if ferromagnetic element 300 is made from a soft-magnetic material the micromagnet 670 will be attracted to, and center itself with respect to, ferromagnetic element 300, thereby holding the shutter blade in the light blocking position. To unblock (uncover) aperture 520, a drive voltage is applied from the power source 550 to the embedded coil 530 causing current to flow in a first direction through embedded coil 530 (as indicated by the arrows on dashed lines) which is beneath micromagnet 670. The magnetic field from the energized embedded coil 530 imparts a torque to micromagnet 670 causing it to rotate counterclockwise about pivot point 700 as indicated by arrow 710, as is well known. Specifically, the torque imparted to micromagnet 670 is due to the Lorentz force of energized embedded coil 530 on the south and north poles 680a and 680b on the bottom surface of micromagnet 670 which dominates the corresponding Lorentz force on the north and south poles 676a and 676b on the top surface of micromagnet 670, as is well know. It is instructive to note that the current through embedded coil 530 must be of sufficient magnitude so that the torque imparted by energized embedded coil 530 to micromagnet 670 overcomes the holding torque imparted to micromagnet 670 by ferromagnetic element 300. The micromagnet rotates until it impacts stop structure 140B (see FIG. 8b). In FIG. 8b the shutter blade 660 is shown in a second, light passing position in which aperture 520 is uncovered thereby allowing light to pass therethrough. The shutter blade 660 is held in this position as long as the power source supplies a sufficient current to coil 530 as noted above. Once the current is discontinued, the shutter blade 660 will rotate clockwise back to the position shown in FIG. 8a as indicated by arrow 720. This rotation is due to the torque imparted to micromagnet 670 by the ferromagnetic element 300 as described above.

The invention has been described in detail with particular reference to certain preferred embodiments thereof, but it will be understood that variations and modifications can be effected within the spirit and scope of the invention.

PARTS LIST 50 ceramic block
60 sacrificial fiber
70 recess
75 recess
80 through-hole
85 top portion
90A recess
90A recess
95A conductive pad
95B conductive pad
100A through-hole
100B through-hole
110A bearing structure
110B bearing structure
115 through-hole
120 through-hole
130 through-hole
140A stop structure
140B stop structure
200 unitary ceramic body
220 recess
230 recess
240 nonporous containment structure
250 vacuum chamber structure
300 ferromagnetic element
310 centerline
Parts List Cont'd
500 assembled actuator
520 shutter aperture
530 embedded coil
550 power source
600 shutter assembly
620 insert
640 rotor
646 shaft
648 top surface
650 top plug
652 ledge
654 surface
660 shutter blade
670 micromagnet
672 micromagnet top surface
674 micromagnet bottom surface
676a north surface pole
676b south surface pole
678 centerline
680a south surface pole
680b north surface pole
690 hole
700 pivot point
710 arrow
720 arrow

We claim:

1. A microceramic electromagnetic light shutter comprising:

(a) a unitary ceramic body having an internal cavity, (b) a conductive coil formed in said internal cavity;

(c) the unitary ceramic body defining a first and second bearing structure on its surface; the unitary ceramic body having a light aperture therethrough and defining first and second recesses;

(d) a shutter drive mechanism, including a shutter blade;

(e) a ferromagnetic element inserted into said first recess and operative relationship to the shutter drive mechanism for applying a torque to said shutter drive mechanism which causes the shutter drive mechanism to move so that the shutter blade is in its light blocking position; and (f) the shutter drive mechanism being mounted in said second recess and in operative relationship to the coil and ferromagnetic element, and having a shutter blade which is movable between light blocking and light passing positions relative to the light aperture so that when a drive voltage is applied to the coil, a field is created by the coil which provides a torque to the shutter drive mechanism to overcome the torque applied by the ferromagnetic element thereby causing the shutter blade to move to the light passing position, and when the drive voltage is discontinued the ferromagnetic element provides a torque on the shutter mechanism causing the shutter blade to return to the light blocking position.

2. A microceramic electromagnetic light shutter according to claim 1 wherein said unitary ceramic body further includes surface features in the form of stop structures that limit the range of motion of said shutter drive mechanism.

3. A microceramic electromagnetic light shutter according to claim 2 wherein the shutter drive mechanism includes an insert member which a bearing surface, a rotor with a shaft, mounted inside the insert member, a micromagnet fixedly attached to said shaft, and a shutter blade fixedly attached to said micromagnet and with said micromagnet being in operational relation to said coil such that when a voltage is applied to said coil it produces a magnetic field that causes said micromagnet with attached shutter blade to rotate.

4. A microceramic electromagnetic light shutter according to claim 3 wherein the insert member is made from low friction ceramic material such as $MoSi_2$ or $ZrB_2$.

5. A microceramic electromagnetic light shutter according to claim 3 wherein the shutter blade is made from light metals such as Al, Mg, Al-alloys or alternatively opaque plastics such as nylon, polyethylene or PVC.

* * * * *